United States Patent
Peters et al.

(10) Patent No.: US 9,320,197 B2
(45) Date of Patent: Apr. 26, 2016

(54) SELF-PROPELLED AGRICULTURAL HARVESTING MACHINE HAVING A CROP ATTACHMENT WHICH IS PIVOTABLE ABOUT A VERTICAL AXIS

(75) Inventors: Ole Peters, Enkenbach-Alsenborn (DE); Klaus Hahn, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 424 days.

(21) Appl. No.: 13/588,455

(22) Filed: Aug. 17, 2012

(65) Prior Publication Data
US 2014/0047810 A1  Feb. 20, 2014

(51) Int. Cl.
| A01D 41/00 | (2006.01) |
| A01D 57/20 | (2006.01) |
| A01D 75/00 | (2006.01) |
| B62D 12/00 | (2006.01) |
| A01D 41/14 | (2006.01) |
| A01D 45/02 | (2006.01) |

(52) U.S. Cl.
CPC .............. *A01D 75/00* (2013.01); *A01D 41/14* (2013.01); *A01D 41/144* (2013.01); *A01D 45/021* (2013.01); *A01D 57/20* (2013.01); *B62D 12/00* (2013.01)

(58) Field of Classification Search
USPC .............. 56/13.6, 14.5, 14.6, 14.9, 15.2–15.5, 56/122, 208, 228, 181–183, 185–188, 192
See application file for complete search history.

(56) References Cited

U.S. PATENT DOCUMENTS

| 281,604 A | * | 7/1883 | Benson ........................... 56/14.5 |
| 4,203,275 A | * | 5/1980 | Vermeer ......................... 56/15.8 |
| 4,329,833 A |   | 5/1982 | Witzel |
| 5,904,365 A | * | 5/1999 | Dillon ............................. 280/419 |
| 6,119,442 A | * | 9/2000 | Hale ............................. 56/10.2 H |
| 6,843,046 B2 | * | 1/2005 | Heidjann et al. ................. 56/208 |
| 7,281,496 B2 | * | 10/2007 | Calabria et al. ................ 119/845 |
| 2012/0159916 A1 | * | 6/2012 | Ishii et al. .................. 56/10.2 A |

FOREIGN PATENT DOCUMENTS

| DE | 29519842 A1 |   | 12/1995 |
| DE | 19921466 A1 |   | 5/1999 |
| DE | 102005004212 A1 |   | 8/2006 |
| EP | 1269823 A1 |   | 6/2002 |
| EP | 1611781 A1 |   | 1/2006 |
| EP | 1733606 A1 |   | 6/2006 |
| EP | 1808063 A1 |   | 1/2007 |
| EP | 1808063 A1 |   | 7/2007 |
| GB | 2153197 A | * | 8/1985 |

OTHER PUBLICATIONS

European Search Report, dated Jan. 17, 2013 (4 pages).

* cited by examiner

*Primary Examiner* — Alicia Torres

(57) ABSTRACT

A self-propelled harvesting machine includes a chassis supported on driven front ground wheels and steerable rear ground wheels. A crop harvesting attachment is supported on steerable driven wheels and is mounted to the front of the harvesting machine for pivoting about an upright axis. The harvesting attachment delivers harvested crop to an intermediate conveyor which feeds the crop to an input conveyor of the harvesting machine. The harvesting attachment includes a power-operated steering actuator and is steered by a steering control device of the harvesting machine.

11 Claims, 4 Drawing Sheets

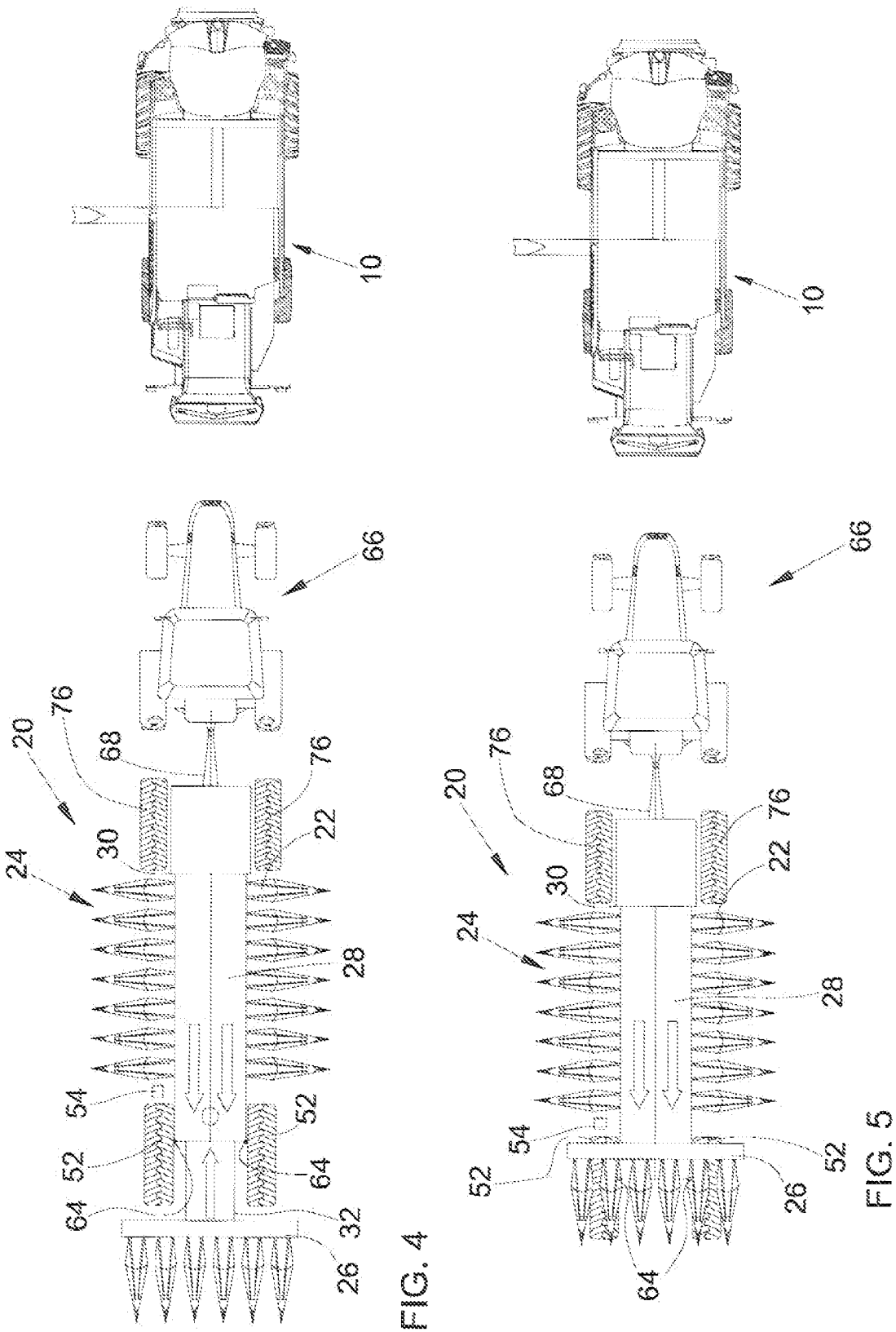

SELF-PROPELLED AGRICULTURAL HARVESTING MACHINE HAVING A CROP ATTACHMENT WHICH IS PIVOTABLE ABOUT A VERTICAL AXIS

FIELD OF THE INVENTION

The present invention relates to a self-propelled agricultural harvesting machine having a steerable mobile chassis supporting a harvested crop processing device and having a forward end to which a crop gathering attachment is releasably connected, and more particularly relates to configuration and connecting features of the crop gathering attachment.

BACKGROUND OF THE INVENTION

Many types of self-propelled agricultural harvesting machines it a chassis, which is provided with driven front wheels and steerable rear wheels. Examples are combine-harvesters and field choppers. A crop attachment for the reception of harvested crop lying or standing on a field is attached on the front end of the chassis of the harvesting machine, with the crop attachment transferring the harvested crop in the harvesting operation to an input conveyor which is connected to the chassis and which is configured in the case of combine-harvesters as a slope conveyor and in the case of field choppers as an input housing. The input conveyor passes the harvested crop into the interior of the chassis, in which harvested crop processing devices, such as threshing, separating and cleaning devices in the case of combine-harvesters and chopping units in the case of field choppers, are arranged.

The crop attachments are usually attached so as to be removable, but otherwise are attached in a rigid manner on the input conveyor. For adaptation to the ground contour, the input conveyor, as a rule, is fastened by means of an actuator so as to be pivotable about an axis extending horizontally and transversely with respect to the forward direction of travel of the chassis of the harvesting machine. A suitable control means detects the height of the crop attachment above the ground by means of a sensor and controls the actuator in such a manner that a desired height or a desired contact pressure of the crop attachment on the ground is achieved. The control means can additionally pivot the crop attachment in relation to the input conveyor about an axis extending horizontally and in the forward direction of the harvesting machine (EP 1 269 823 A1), which, for example in the case of slope combine-harvesters with vertically adjustable wheels for the automatic horizontal alignment of the chassis, is sensible when travelling over slopes. Pivoting the crop attachment automatically about an axis extending horizontally and transversely with respect, to the forward direction in relation to the input conveyor has been proposed (DE 295 19 842 U) in order continually to obtain an optimum outing angle of the combine blades in relation to the harvested crop. Crop attachments which are pivotable in relation to the input conveyor about horizontal axes are consequently known.

In order to reduce the radius of the curve followed by the outer end of the crop attachment and in this way to be able to maneuver the harvesting machine in an easier manner during free cutting of the headland in the corners of a field, or to align the divider of the crop attachment also in curves transversely with respect to the forward direction of the crop attachment, it has been proposed to link the entire crop attachment so as to be pivotable about the vertical axis in relation to the harvesting machine and to drive it in dependence on the steering angle of the harvesting machine (EP 1 808 063 A1 and EP 1 733 608 A1).

Currently there is a need for wider and wider crop attachments. The width of crop attachments not supported separately on the ground, however, is limited by the carrying capacity of the harvesting machine or of the soil under the wheels or caterpillar running gear of the harvesting machine. Harvesting machines with wheels attached on the crop attachment have also certainly been described (U.S. Pat. No. 4,329, 833 A1), however it is to be feared that when ground conditions are difficult, such as for example on a slope or where sols are saturated, a harvesting machine of this type with the crop attachment is nevertheless hardly to be moved forward because only the wheels of the harvesting machine are driven and the passively steered (suspended trailing) wheels of the harvesting machine on the slope are, for example, only able to contribute very little to guide the crop attachment along its desired track.

SUMMARY OF THE INVENTION

Problem

The object underlying the invention is to provide a self-propelled harvesting machine which has a crop attachment which is pivotable about the vertical axis in relation to the harvesting machine, and which is able to be moved easily over a field even when ground conditions are difficult.

Solution

The aforementioned object is achieved according to the invention by the teaching of claim 1, features which further develop the solution in an advantageous manner being stated in the further patent claims.

A self-propelled agricultural harvesting machine includes a chassis which is supported on means which are in contact with the ground (e.g. wheels and/or caterpillar running gear and by means of which the harvesting machine is movable over a field in a normal forward direction. The harvesting machine is provided with a steering control device, which is based on a sensor system which operates manually or automatically, e.g. on a satellite-based position recognition device and/or detects the existence of the field in a mechanical or optical manner, by way of which the means situated in contact with the ground are steerable, to which end wheels can be adjusted about the vertical axis and the caterpillar running gear can be driven at different speeds. A crop processing device is arranged within the chassis and at the front end of the chassis there is an input conveyor, a crop attachment which is mounted so as to be pivotable about a vertical axis in relation to the chassis being arranged upstream of said input conveyor. The harvested crop is supplied in the harvesting operation by the input conveyor to the harvested crop processing device. The crop attachment is supported on the ground by drivable crop attachment ground contacting means which are steerable by means of a power-operated actuator which is coupled to the steering control device, it being possible for said crop attachment ground contacting means also to be wheels and/or caterpillar running gear.

In other words, the crop attachment is provided with steerable and driven ground contacting means (in the form of wheels and/or caterpillar running gear). The actuator for steering the crop attachment ground contacting means is connected to the steering control device of the harvesting machine such that the crop attachment ground contacting means can be steered manually or automatically in a desired manner in order to move the crop attachment and the harvesting machine along a desired path. In this way, the ape attachment is not only supported by the crop attachment ground contacting means, but is also moved actively forward and actively steered. As a result, the traction in the case of difficult ground conditions is improved and ground compaction is reduced. A separate actuator for pivoting the crop attachment in relation to the chassis of the harvesting machine is superfluous.

In the case of a preferred embodiment, another elongated intermediate conveyor is arranged between the crop attachment and the input conveyor. The crop attachment is offset forward in relation to the harvesting machine which is advantageous in that the width of the crop attachment can be developed in such a manner that it can extend in the lateral direction beyond the outer end of a discharge conveyor of the harvesting machine and a transport vehicle can drive along behind the crop attachment, inside its lateral outline, for taking over the harvested crop or remains of the harvested crop. The discharge conveyor of the harvesting machine must also no longer be constructed so long that it extends laterally beyond the crop attachment.

The crop attachment can include three segments with means for receiving the harvested crop, on the rear side of which conveyors are arranged which transfer the received harvested crop to the intermediate conveyor. The central segment for receiving the harvested crop can be a conventional crop attachment which is usually used on its own, for example a cutting system with a cross conveyor screw or belts for cross conveying the harvested crop. The crop attachment which is usually used on its own can be attached on the intermediate conveyor so as to be removable by means of conventional holders.

To transport the crop attachment on a road, the segments of the crop attachment can be moved into a folded-in transport position, in which outer segments are pivoted to the rear about the vertical axes in opposition to the forward direction out of their operating position and are situated above the intermediate conveyor. The central segment (or the outer segments) of the crop attachment can then be displaced additionally into a transport position in relation to the crop attachment ground contacting means in opposition to the forward direction. The crop attachment can then be towed by the harvesting machine or another towing vehicle to the next use or for parking.

The conveying speed of the intermediate conveyor is preferably modifiable and is controllable by way of a sensor for the proactive detection of the quantity of the received harvested crop in terms of homogenizing the rate of the harvested crop supplied to the harvested crop processing device. Reference is made in this connection to the disclosure of DE 199 21 466 A1.

The vertical axis, about which the crop attachment is pivotable in relation to the vehicle, can be situated between the intermediate conveyor and the input conveyor or between the crop attachment and, the intermediate conveyor. It is also conceivable to provide two such axes, one of which is situated between the intermediate conveyor and the input conveyor and, the other is situated between the crop attachment and the intermediate conveyor.

As a rule, the control of the actuator for the steering of the crop attachment ground contacting means is effected in such a manner that said means are driven in the opposite direction to the steerable means of the harvesting machine which are in contact with the ground. As a result, the crop attachment is moved along approximately the same path as the harvesting machine, which, for example, results in a reduced timing radius when turning at the end of the field. When driving on a slope, however, it can be sensible to supply signals to the steering control device with regard to a slope gradient, and to drive the actuator of the crop attachment by the steering control device in dependence on the slope gradient, so that the crop attachment is moved along a desired path by it being towed up the slope by the crop attachment ground contacting means in order to balance out any possible slippage.

The present invention is suitable for all types of self-propelled harvesting machines such as combine-harvesters, field choppers, cotton pickers or self-propelled baling presses.

BRIEF DESCRIPTION OF THE DRAWINGS

An exemplary embodiment of the invention described below is shown in the drawings, in which, in detail:

FIG. 4 shows the crop attachment from FIG. 1 in a position moved partially into the transport position, and FIG. 5 shows the crop attachment from FIG. 1 in a position moved completely into the transport position.

DESCRIPTION OF THE PREFERRED EMBODIMENT

Figure 1:
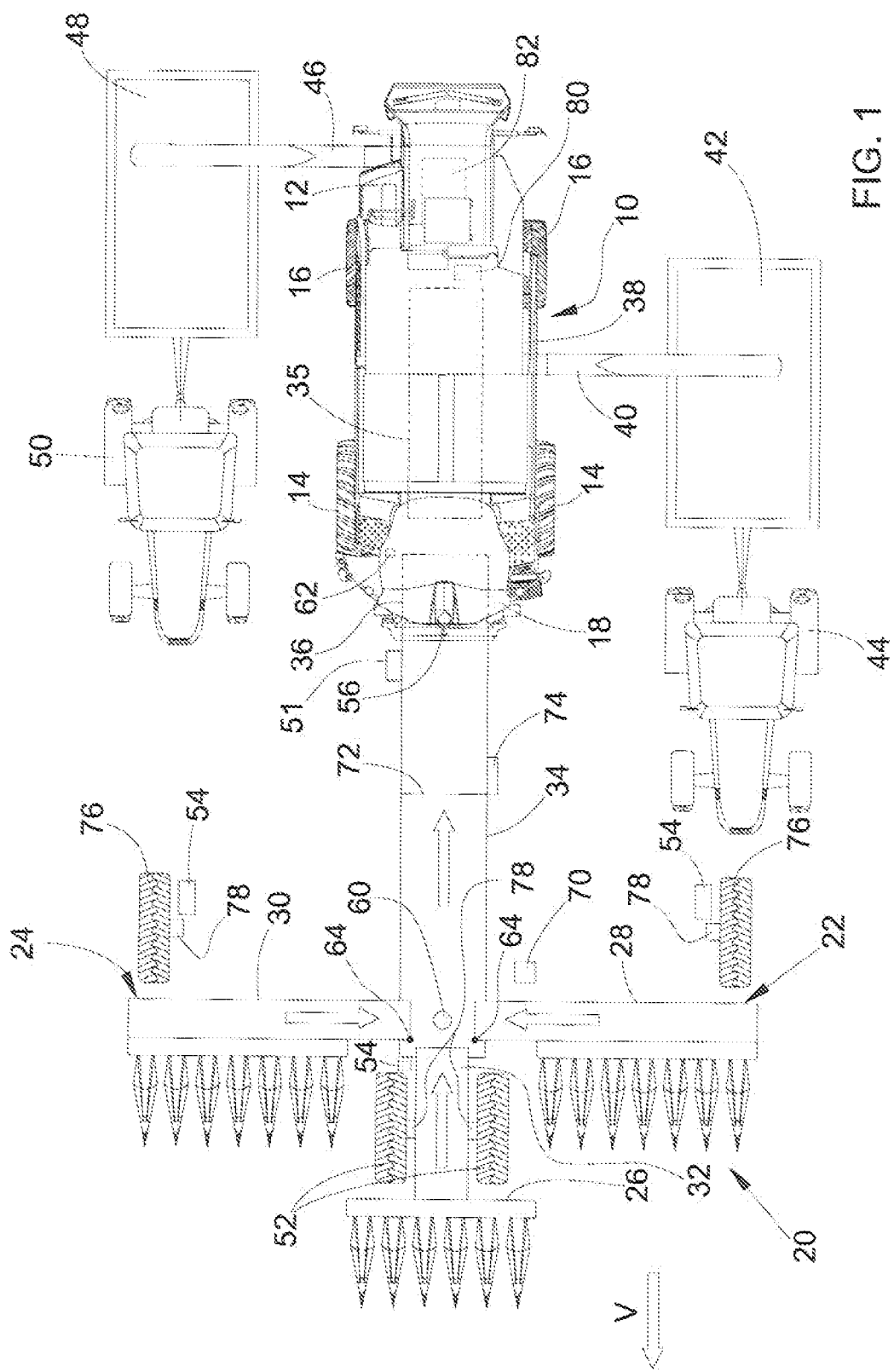
FIG. 1 shows a top view of a self-propelled harvesting machine with a crop attachment and two transport vehicles.

A harvesting machine 10 shown in FIG. 1 in the form of a combine-harvester includes a chassis 12, which is carried on two front driven means in the form of wheels 14, which are situated in contact with the ground, and two rear, steerable means in the form of wheels 16, which are situated in contact, and has a driver's cab 18, from where the harvesting machine 10 can be operated by a driver. When harvesting and when travelling on a road, the harvesting machine 10 is moved forward in the normal forward direction of travel V which is defined by the direction of the line of vision of the driver in the driver's cab 18. It can, however, also be driven temporarily in reverse. e.g. for turning.

A crop attachment 20 in the form of a corn picker with a picking unit constructed from three segments 22, 24 and 26 is used in order to receive harvested crop and to supply it by means of rear conveyors 28, 30, 32 to an elongated intermediate conveyor 34, which supplies it to an input conveyor 36 of the harvesting machine 10 which is realized as a slope conveyor. The harvested crop is supplied from the input conveyor 36 to a harvested crop processing device 35 of the harvesting machine 10, which is known per se and can be realized as an axial or tangential threshing unit and threshes and separates the harvested crop. Grain and chaff fan through grates on the floor of the harvested crop processing device 35 into a cleaning system which removes chaff and supplies the clean grain to a grain elevator which deposits the clean grain in a grain tank 38. The clean grain in the grain tank 38 can be unloaded by an unloading conveyor 40 into a trailer 42 towed by a first transport vehicle 44. Threshed straw stripped of grain is ejected from the harvested crop processing device 36 through an outlet channel 46 into a trailer 48 towed by a second transport vehicle 50. The driveable components of the harvesting machine 10 are driven by an internal combustion engine. All directional specifications below, such as forward and back relate to the normal forward direction of travel V.

The three segments 22, 24 and 26 of the crop attachment are located such that the segment 22 is situated on the left-hand side of the elongated intermediate conveyor 34 and the segment 24 is situated on the right-hand side of the elongated intermediate conveyor 34. The rear conveyors 28 and 30 of the left-hand and right-hand segments 22, 24 convey the harvested crop transversely with respect to the forward direction V to the center of the crop attachment 20, where it is taken over by the intermediate conveyor 34 and supplied to the input conveyor 36.

The central segment 26 of the crop attachment 20 is arranged ahead of the left-hand and right-hand segments 22, 24 and its conveyor 32 conveys the harvested crop received by the central segment 26 rearward to the intermediate conveyor 34. The central segment 26 can be a separate, conventionally available crop attachment. As the central segment 26 overlaps laterally with the inner regions of the segments 22 and 24, there is no loss of harvested crop when travelling round corners. However, as an alternative or in addition to this, the central segment 26 could be displaced towards the centre of the curve by means of an actuator (not shown) when travelling round corners or rotated about a vertical axis in order to avoid these types of harvested crop losses.

The conveyors. 28, 30, 32 and 34 can be realized as belt conveyors and can each be driven by a variable speed electric or hydraulic motor (51). The driven elements of the segments 22 to 26 can also be driven by means of electric motors or hydraulic motors. In place of the shown crop attachment 20 which is suitable for corn crops, it would also be possible to use a crop attachment which is suitable for cereal crops, is rigid or flexible per se and is provided with reels, cutter bars and conveyors in the form of screws or conveyor belts. It would also be conceivable as an alternative to provide the crop attachment 20 with reaping drums which make it possible to receive the harvested crop with a low error and blockage rate in particular for autonomous harvesting machines which are not occupied by an operator. The crop attachment 20 can also be provided for the sunflower crop.

Figure 2:
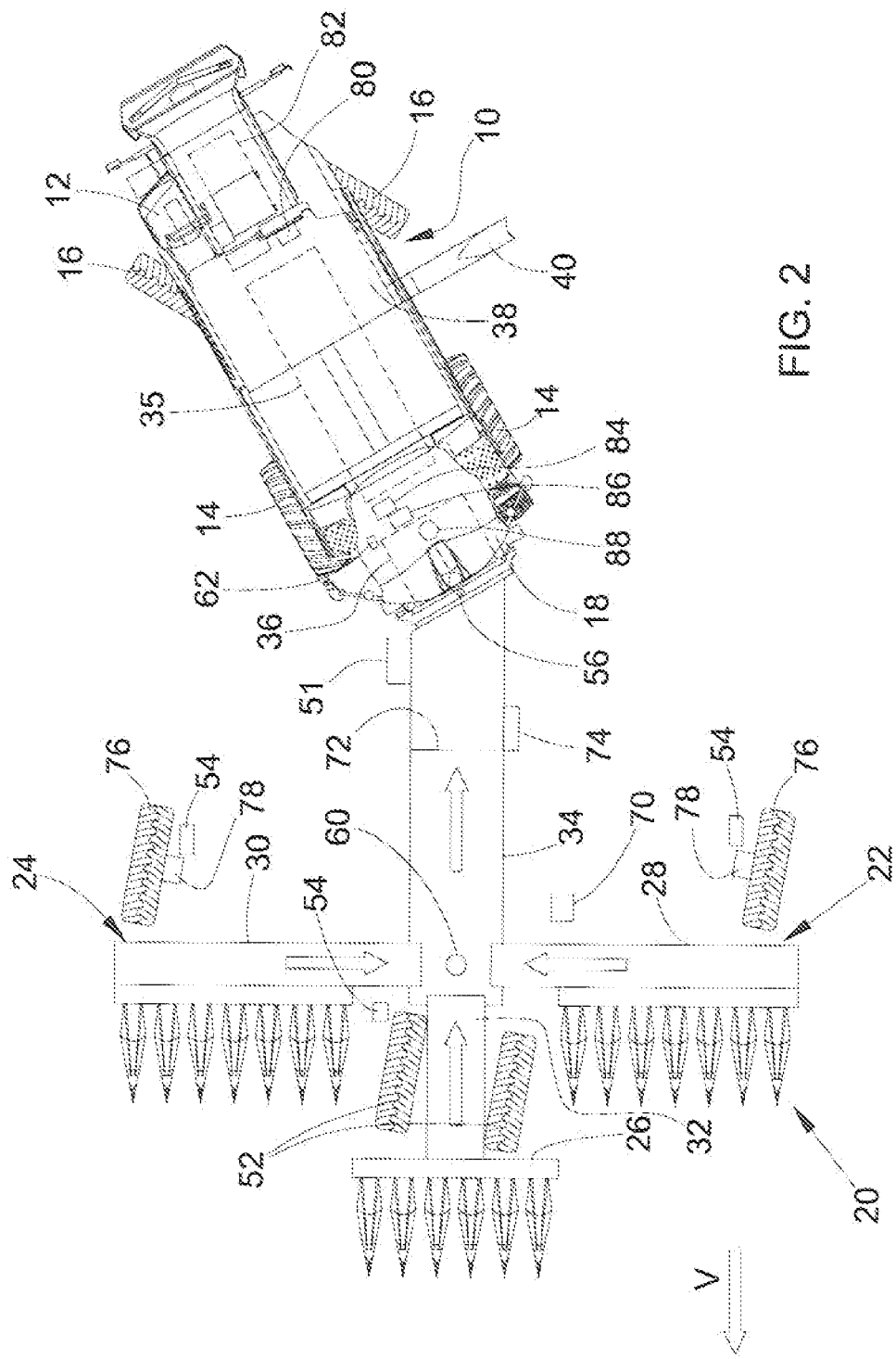
FIG. 2 shows the harvesting machine from FIG. 1 when turning a curve.
Figure 3:
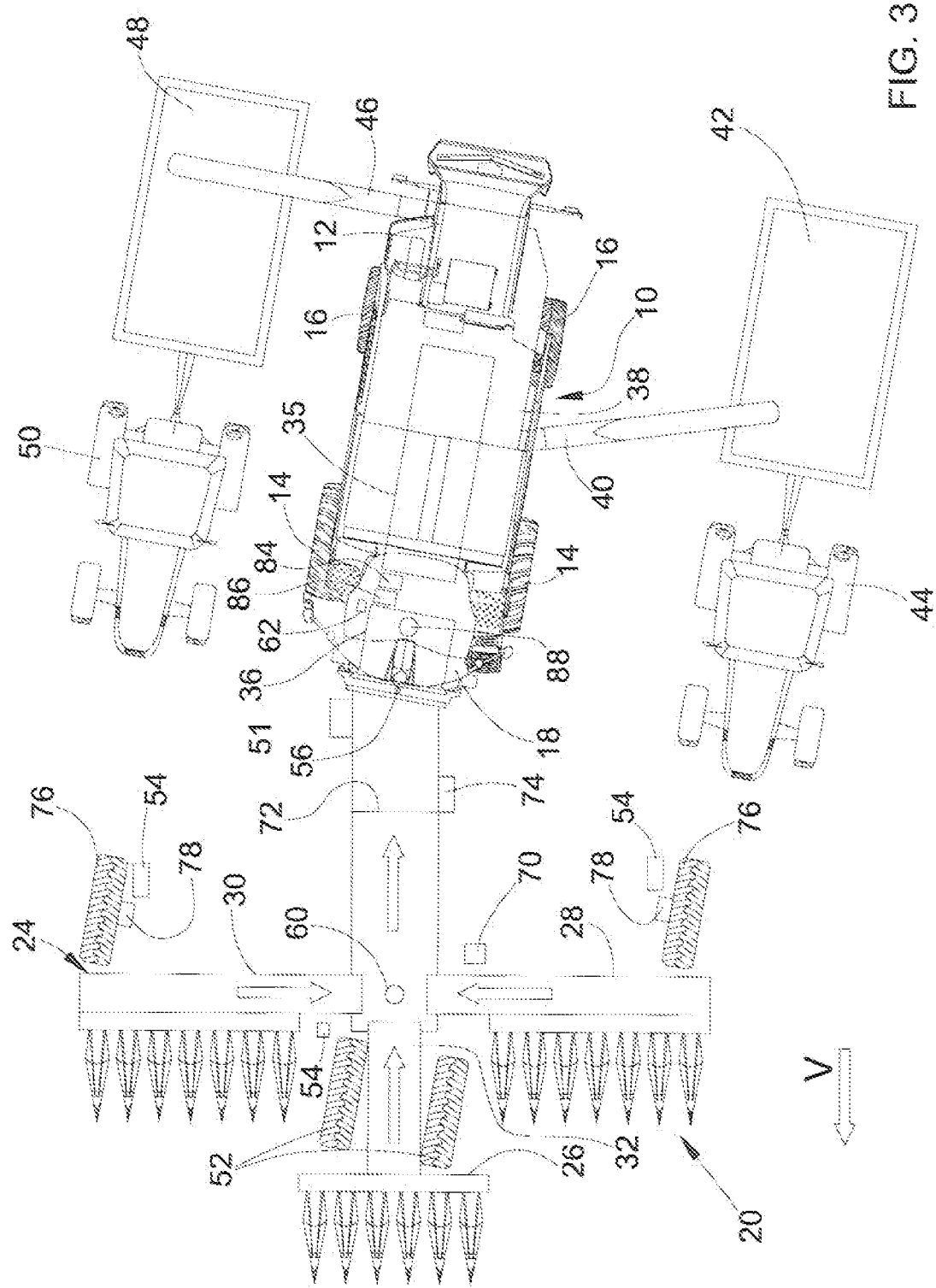
FIG. 3 shows the harvesting machine from FIG. 1 when travelling on a slope.

The crop attachment 20 is provided with crop attachment around contacting means in the form of two front wheels 62 which are drivable by means of electric or hydraulic motors 74 and are steerable by means of a power-operated actuator 54 which can be realized as a hydraulic cylinder or an electric motor. The motors 78 are provided with electrical power or pressurized hydraulic fluid by a generator or pump 80 which is driven, by an engine 82 of the harvesting machine and connected to the generator or pump 78 by suitable hydraulic or electrical lines (not shown). The elongated intermediate conveyor 34 has its rear end coupled on the input conveyor 36 so as to be pivotable about a vertical axis 56. A further (or alternatively usable) axis 60, about which the intermediate conveyor 34 can be pivotably coupled in relation to the crop attachment 20, is situated between the crop attachment 20 and the elongated input conveyor 34. A steering control device 62 of the harvesting machine 10 is connected on the one side to actuators for steering the rear wheels 16 and on the other side to the actuators 54 for steering the crop attachment ground contacting wheels 52. As can be seen by way of the situation shown in FIG. 2 when turning the harvesting machine 10 in the headland, the steering control device 62 drives the rear wheels 16 and the crop attachment ground contacting means 52 usually in opposite directions such that the crop attachment 20 and the harvesting machine 10 move along a common path and the Ackermann law is met. The angles of the unloading conveyor 40 and of the outlet channel 46 can, as shown in FIG. 3, be synchronized automatically with the angle of the intermediate conveyor 34 about the axis 56 in order to make the work easier for the drivers of the transport vehicles 44, 50.

The input conveyor 36 is coupled in a conventional manner so as to be pivotable on the chassis 12 of the harvesting machine 10, at its rear end about an axis which extends transversely with respect to the forward direction V and horizontally. The intermediate conveyor 34 is fastened in a rigid manner (not pivotably) on the input conveyor 36. As the crop attachment 20 is supported on the ground by the ground contacting wheels 52, an actuator provided for the pivoting of the input conveyor 36 about the transverse axis at the chassis 12 can be operated in a floating mode, in which the input conveyor can be freely pivoted about the axis, or said actuator can be omitted completely. It would also be conceivable to provide the elongated intermediate conveyor 34 in particular in the region of its center with an articulated joint 72 with a horizontal pivot axis which extends transversely with respect to the forward direction, with which an adjusting actuator 74 can be associated. As an alternative or in addition to this, the adjustment of the articulated joint 72 is effected by the actuator for adjusting the input conveyor 36 about the horizontal axis which extends transversely with respect to the forward direction V. The articulated joint 72 can avoid the intermediate conveyor 34 being placed in ground undulations (in particular knolls) and/or can adapt the setting angle of the segments 22 to 26. In the case of another embodiment, the intermediate conveyor 34 is attached on the input conveyor 36 so as to be pivotable about a horizontal axis which extends transversely with respect to the forward direction V. The articulated joint 72 can then only be adjusted by the actuator 74, or the articulated joint 72 is omitted and the adjustment of the setting angle of the segments 22 to 26 is effected by the actuator for adjusting the input conveyor 36.

Further crop attachment ground contacting means in the form of wheels 76 are attached on the outer ends of the outer segments 22 and 24. The further wheels 76 are also steerable by means of actuators 54 which are connected to the steering control device 62. Preferably, they are also driven by electric or hydraulic motors 78 powered by the generator or pump 80 on board the harvesting machine 10. The ground contacting wheels 76 make it easier to guide the crop attachment 20 parallel to a slope. In addition, they make the steering of the crop attachment 20 easier in the case of the embodiment with the two vertical axes 56 and 60.

Signals with regard to a slope gradient, which can be provided by a suitable slope sensor 84 or by way of a stored three-dimensional map 86 and a position determining device 88, can be supplied to the steering control device 62. The steering control device 62 can consequently drive the steering actuators 54 of the crop attachment 20 in dependence on the inclination of the slope, as is illustrated by way of FIG. 3, which shows the operation of the harvesting machine 10 and of the transport vehicles 44, 50 with the trailers 42, 48 on the slope. The harvesting machine 10 and the crop attachment ground contacting wheels 52 are then steered up the slope in order to balance out the slippage going down the slope and to move the harvesting machine 10 and the crop attachment 20 along a desired path.

FIGS. 4 and 5 show the way in which the crop attachment can be moved into the transport position for transport on a road. Once the intermediate conveyor 34 has been separated from the input conveyor 36 and the harvesting machine 10 removed, the left-hand and right-hand segments 22 and 24, respectively, with their conveyors 28 and 30 are pivoted to the back about vertical axes 64 (in relation to the operating position shown in FIG. 1) manually or by means of suitable actuators in opposition to the forward direction V, until their conveyors 28, 30 abut against each other and are oriented in the forward direction V. The position shown in FIG. 4 is then obtained. The central segment 26 with the conveyor 32 is then pulled to the back manually or by means of suitable actuators in relation to a frame which holds the crop attachment ground contacting wheels 52, on which frame segments 22, 24 are also coupled at the axes 64, and is positioned above the wheels 52 such that the situation shown in FIG. 5 is created. The crop attachment 20 can then be towed along by means of a coupling 68 mounted on the intermediate conveyor 34 behind the harvesting machine 10 or a separate tractor 66. In this case, the crop attachment ground contacting wheels 52 are moved in a straight-on travelling position by the steering actuators 54. The elongated intermediate conveyor 34 could, contrary to what is shown, also be realized shorter than the left-hand and right-hand segment 22, 24 and could be extended for road travel (FIG. 5) by means of an extendible drawbar in order to be able to attach the coupling 68 to the rear of the segments 22, 24, or the coupling 68 is attached at the back (on the outside in the situation according to FIG. 1) on one or both of the segments 22, 24. The central segment 26 could also be pivoted upward above the ground contacting wheels 52 about a horizontal axis (not shown) which extends transversely with respect to the forward direction V, instead of displacing them as in FIG. 5, or they could remain in the position according to the FIG. 4 when travelling along a road.

An advantage of the elongated intermediate conveyor 34 is that both transport vehicles 44, 50 can travel behind the crop attachment 20 within the lateral definitions of the crop attachment 20. In addition, the relatively long conveying section of the intermediate conveyor 34 makes it possible to make the rate at which the harvested crop is supplied to the harvested crop processing device 35 uniform, by the conveying speed of the intermediate conveyor being automatically modified in response to one or several sensors 70, which serve for the proactive detection of the quantity of the received harvested crop. The sensor 70 can, for example, measure the driving power of the conveyers 28 to 32 by way of the electric currents received or the fall in hydraulic pressure at the hydraulic motor serving for the drive or can detect the quantity of harvested crop standing in front of the crop attachment 20 by means of a camera or a laser scanner in an optical manner. In addition, the elongated intermediate conveyor 34 makes it possible to detect, by, means of a detector, any foreign bodies possibly received, which detector can operate, for example, with X-ray radiation or microwaves and keep the harvesting machine including the intermediate conveyor 34 running smoothly and in a timely manner so that the foreign bodies are able to be removed by the operator or automatically by suitable means.

Having described the preferred embodiment, it will become apparent that various modifications can be made without departing from the scope of the invention as defined in the accompanying claims.

The invention claimed is:

1. In a self-propelled agricultural harvesting machine (10) having a chassis (12), which is supported on means (14, 16) which are in contact with the ground and by way of which the harvesting machine (10) is movable over a field in a normal forward direction of travel (V), a steering control device (62) by way of which the means (14, 16) which are in contact with the ground are steerable, a harvested crop processing device (35) which is arranged within the chassis (12) and an input conveyer (36) which is arranged on the front end of the chassis (12), a crop attachment (20), which is mounted so as to be pivotable about a vertical axis in relation to the chassis (12) for the reception of harvested crop, being arranged upstream of said input conveyor, said harvested crop being delivered in the harvesting operation by the input conveyor (36) to the harvested crop processing device (35), wherein said crop attachment (20) being supported on the ground by drivable and steerable crop attachment ground contacting means (52, 76); a power-operated steering actuator (54) being coupled for effecting steering of said ground contacting means (52, 56); and said steering control device (62) being coupled to said steering actuator (54), wherein an elongated intermediate conveyor (34) is arranged between the crop attachment (20) and the input conveyer (36), wherein the crop attachment (20) Includes a left-hand segment (22), a right-hand segment (24) and a central segment (26) with means for the reception of the harvested crop, and having respectively arranged on their rear sides a left-hand conveyor (28), a right-hand conveyor (30) and a central conveyor (32) which transfer the received harvested crop in the harvesting operation to the intermediate conveyor (34) wherein the left-hand and right-hand segments (22, 24) have respective inner ends mounted for pivoting about vertical axes (64), whereby the left-hand segment (22) and right-hand segment (24) of the crop attachment (10) are mounted for movement into a folded-in transport position, in which the left-hand and right-hand segments (22, 24) are pivoted to the rear about the vertical axes (64) out of their operating position in opposition to the forward direction and are situated above the intermediate conveyor (34).

2. The harvesting machine (1) according to claim 1, wherein the crop attachment ground contacting means (52) is located adjacent a forward end of the intermediate conveyor (34); and the central segment (26) of the crop attachment (20) being mounted for rearward displacement relative to the right-hand and left-hand segments (22, 24) and being additionally displaceable rearward into a transport position located above the crop attachment ground contacting means (52).

3. The harvesting machine (10) according to claim 1, wherein a variable speed motor (51) is coupled for driving the intermediate conveyer (34); a sensor (70) for sensing the amount of crop being conveyed by the intermediate conveyor (34) is operable for generating a speed control signal and is coupled to the variable speed motor (51) for controlling its speed thereby controlling the conveying speed of the intermediate conveyor (34) for the proactive detection of the quantity of the received harvested crop in terms of homogenizing the rate of the harvested crop supplied to the harvested crop processing device (35).

4. The harvesting machine (10) according to claim 1, wherein the vertical axis (56), about which the crop attachment (20) is pivotable in relation to the chassis (12), is situated at least one of between the intermediate conveyor (34) and the input conveyor (36) or between the crop attachment (20) and the intermediate conveyor (34).

5. The harvesting machine (10) according to claim 1, wherein a slope sensor (84) is provided for sensing a lateral slope of terrain supporting the harvesting machine and generating a signal representing the sensed lateral slope, said lateral slope sensor (84) being connected to the steering control device (62); and said steering control device (62) being operated to drive the steering actuator (54) of the crop attachment (20) in dependence on the lateral slope.

6. The harvesting machine (10) according to claim 1, wherein the crop attachment ground contacting means (52, 76) are fastened on the central segment (26) and the left-hand segment (22), and the right-hand segment (24).

7. The harvesting machine (10) according to claim 1, wherein the elongated intermediate conveyor (34) is provided with an approximately central articulated joint (72).

8. The harvesting machine (10) according to claim 1, further comprising a motor (78), wherein the crop attachment ground contacting means (52, 76) is drivable by the motor (78).

9. The harvesting machine (10) according to claim 1, further comprising a hydraulic motor (78), wherein the crop attachment ground contacting means (52, 76) is drivable by the hydraulic motor (78).

10. The harvesting machine (10) according to claim 1, further comprising an electric motor (78) wherein the crop attachment ground contacting means (52, 76) is drivable by the electric motor (78).

11. The harvesting machine (10) according to claim 1, further comprising a means (78) for driving the crop attachment ground contacting means (52, 76).

* * * * *